ORSON P. BEARDSLEY, OF McDONOUGH, NEW YORK.

Letters Patent No. 89,195, dated April 20, 1869.

IMPROVED PROCESS OF REFINING MAPLE SUGAR.

The Schedule referred to in these Letters Patent and making part of the same.

Specification of a certain Improvement in Process for Refining Maple Sugar, invented by ORSON P. BEARDSLEY, of McDonough, in the county of Chenango, and State of New York.

Nature and Object of the Invention.

This invention is an improvement upon the process for the same purpose for which Letters Patent of the United States were granted to me, bearing date September 17, 1861.

The object of the present invention, as well as of that set forth in the Letters Patent above mentioned, is to extract the magnesia and adherent impurities which are found in maple sugar; and The invention, set forth in said patent consists in extracting these substances, by straining the sugar through a thick cloth, at the time or after the process of evaporation was so far advanced as to cause the magnesia to granulate, or assume a distinct form.

The process described in said Letters Patent contemplated straining the sugar in the concentrated state to which it had been reduced. That process, while it accomplished the purpose intended and produced excellent results, was still subject to the objection that the sugar in this concentrated state passed through the strainer with difficulty, and the process, therefore, involved more labor and pains than the simple straining of the sirup in a limpid state, and before it had been brought to that consistency.

The object of the present improvement is to obviate this objection. Since obtaining the patent above referred to, I have ascertained, by experiment, that if the process of evaporation be carried sufficiently far to cause the magnesia to granulate, or assume a distinct form, it may then be reduced to a convenient consistency for straining, without redissolving the magnesia; and My present improvement consists in extracting the magnesia and adherent impurities, by reducing the sugar from a state of sufficient concentration to cause granulation in the magnesia, and then straining it, substantially as hereinafter set forth.

General Description.

This process of refinement and purification is intended to be used in the process of manufacturing the sugar, as being the most convenient, but it is entirely available for refining sugar, the manufacture of which has been already completed.

In practising this process during the manufacture of the sugar, the sugar must be boiled down to a sufficient consistency to cause granulation in the magnesia which is contained in the sugar, which granulation takes place shortly before the sugar has been so concentrated that upon cooling it will assume a solid form.

I then introduce sufficient water, or sap to reduce the sugar to be operated upon to an ordinary sirup, sufficiently limpid to be conveniently strained, and then extract the magnesia by straining the mass through a thick cloth, and for this purpose a woollen cloth is preferred, for the reason stated in the patent above referred to.

It is probably better to allow the sirup to cool before straining it, as the result will probably be, in that case, more perfect.

In refining sugar, the manufacture of which has been already completed, the sugar is dissolved in water sufficiently to reduce it to the consistency of sirup, sufficiently limpid to be easily strained, and then the magnesia and adherent impurities are extracted, in the manner hereinbefore described.

Claim.

I claim as my invention, extracting magnesia and adherent impurities from maple sugar, by reducing the sugar from a consistency sufficient to cause granulation in the magnesia, and straining it, substantially as hereinbefore set forth.

ORSON P. BEARDSLEY.

Witnesses:
THOMAS H. WARTON,
WALTER HALL.